United States Patent
Eliot, Jr.

(10) Patent No.: US 8,393,650 B2
(45) Date of Patent: Mar. 12, 2013

(54) HANDS-FREE TRAILER LATCHING AND RELEASING MECHANISM FOR A BOAT

(76) Inventor: John Eliot, Jr., Ventura, CA (US)

( * ) Notice: Subject to any disclaimer, the term of this patent is extended or adjusted under 35 U.S.C. 154(b) by 289 days.

(21) Appl. No.: 12/731,885

(22) Filed: Mar. 25, 2010

(65) Prior Publication Data

US 2011/0236126 A1  Sep. 29, 2011

Related U.S. Application Data

(60) Provisional application No. 61/166,502, filed on Apr. 3, 2009.

(51) Int. Cl.
| | |
|---|---|
| E05C 1/02 | (2006.01) |
| E05C 1/06 | (2006.01) |
| E05C 1/08 | (2006.01) |
| E05C 1/12 | (2006.01) |
| B63B 21/04 | (2006.01) |
| B60P 3/10 | (2006.01) |

(52) U.S. Cl. ........ 292/137; 292/157; 292/163; 292/173; 292/143; 114/218; 114/344

(58) Field of Classification Search .......... 292/137, 292/157, 158, 159, 161, 163, 164, 173, 175, 292/138, 143, 145; 70/258; 114/344, 218; 280/414.1, 508, 509, 510
See application file for complete search history.

(56) References Cited

U.S. PATENT DOCUMENTS

| | | | | |
|---|---|---|---|---|
| 266,498 | A * | 10/1882 | Monroe | 292/153 |
| 426,389 | A * | 4/1890 | Lacey | 292/171 |
| 599,245 | A * | 2/1898 | Merrill | 70/33 |
| 741,014 | A * | 10/1903 | Covert | 24/600.8 |
| 919,750 | A * | 4/1909 | Neumeister | 292/60 |
| 1,036,583 | A * | 8/1912 | Diedrich | 292/162 |
| 1,180,943 | A * | 4/1916 | Prazmo | 292/163 |
| 1,616,189 | A * | 2/1927 | Hjert | 292/173 |
| 2,295,021 | A * | 9/1942 | Weiss | 280/506 |
| 3,161,422 | A | 12/1964 | Wade | |
| 3,989,267 | A | 11/1976 | Robinson | |
| 4,114,920 | A | 9/1978 | Boettcher | |
| 4,418,936 | A * | 12/1983 | Adams et al. | 280/493 |
| 4,919,446 | A | 4/1990 | Higgins | |
| 5,000,471 | A | 3/1991 | Sumrall | |
| 5,120,079 | A | 6/1992 | Boggs | |
| 5,129,667 | A * | 7/1992 | Gratton | 280/493 |
| 5,193,835 | A | 3/1993 | Sheets | |
| 5,297,407 | A * | 3/1994 | Tarr | 70/232 |
| 5,683,214 | A | 11/1997 | Jeffreys | |
| 5,879,114 | A | 3/1999 | Spence | |
| 5,895,185 | A | 4/1999 | Spence | |
| 6,070,308 | A * | 6/2000 | Rohlf | 24/600.8 |
| 6,135,482 | A * | 10/2000 | Larkin | 280/416.1 |
| 6,422,322 | B1 * | 7/2002 | Hoffart | 172/439 |
| 6,427,496 | B1 * | 8/2002 | Hurst | 70/14 |
| 6,478,094 | B2 * | 11/2002 | Alexander et al. | 172/439 |
| 6,598,896 | B1 | 7/2003 | Hyslop | |
| 6,679,512 | B1 * | 1/2004 | Plessala | 280/504 |
| 6,923,138 | B2 | 8/2005 | Holbrook | |
| 7,475,899 | B2 * | 1/2009 | Crawley | 280/435 |

* cited by examiner

*Primary Examiner* — Thomas Beach
*Assistant Examiner* — Nathan Cumar
(74) *Attorney, Agent, or Firm* — Ralph D. Chabot

(57) ABSTRACT

The invention relates to a mechanism that attaches and releases a boat or personal watercraft or the like to a trailer or lift or the like and includes a trigger which can move between a secured and released condition by means of contact with the boat or manually and which is biased by an energy storage device. Said trigger in turn may restrict or release a securing member or members which releases or secures a boat's eye-hook. Said securing member may be biased by a primary energy device that may be moved to a locked or released condition as desired to attach the boat to, or release the boat from, the trailer.

10 Claims, 14 Drawing Sheets

HANDS-FREE TRAILER LATCHING AND RELEASING MECHANISM FOR A BOAT

PRIORITY CLAIM

Priority is claimed to provisional application No. 61/166,502 filed Apr. 3, 2009.

BACKGROUND OF THE INVENTION

The present invention relates in general to latching mechanisms which are designed to securely connect one object to another object, such as a boat to a boat trailer. More specifically, the present invention is an automatic latching and releasing mechanism, which may be mounted on an appropriately equipped boat trailer, and latches or releases the securing eye of a boat.

Numerous attempts have been made in recent decades to solve the inconvenience and risk of injury associated with the present commonly used method of securing a boat to a trailer with a winch, strap and hook. This method usually entails the manual cranking of a winch to draw or release a strap that may be connected to a hook that may be hooked to the securing eye on the centerline of the bow of a boat. It typically requires an individual to access the point at which the boat and the trailer come in contact while the boat is in the water by wading in the water, leaning over the bow of the boat or climbing onto the tongue of the trailer. This current prevalent method is not only dangerous and inconvenient but is particularly difficult for one person to perform alone. It is also very difficult for an individual of limited strength to perform.

A few products are already on the market that are designed to solve the problems associated with trailering a boat.

A boat latch sold under the trademark SNAPPER, manufactured by EPCO Products, Inc., Fort Wayne, Ind. is an electronically controlled attachment device that entered the market within the last 2 years. The device is cumbersome to install due its design and electrical hook up necessity as well expensive and vulnerable due to the electronics near a water environment.

A boat latch sold under the trademark BOAT BUDDY, manufactured by ROECO, Inc. Fort Worth, Tex. is a simple and inexpensive device that attaches a boat to a trailer but does not offer an effective or convenient way to release the boat from the trailer. In effect, this device creates as much inconvenience in releasing a boat from a trailer as it creates convenience in connecting the two.

Another product on the market is the boat latch sold under the trademark LAUNCH AND RETRIEVE BOAT LATCH manufactured by Release & Retrieve Boat Latch Pty Ltd, Adelaide, Australia. This product incorporates a latch that is offset from a boat's centerline and utilizes a unique eyehook on a boat's bow. Incumbent to the product's design is the necessity to change the typical eye hook found on most modern boats which can be a cumbersome exercise. Also disadvantageous to this product is that its design forces a boat's bow off center in order to latch putting lateral pressure on the boat trailer's guides causing potential damage.

A wide variety of mechanisms have been designed using clasps, pins and hooks to automatically secure a boat to a trailer. Most are designed to eliminate the need for an individual to access the point of contact between boat and trailer while the boat is in the water when loading a boat onto a trailer. While one common element among most is their use of the securing eye that is standard equipment on most boats, other elements of prior designs vary widely.

One such earlier design for latching a boat to a trailer was a mechanism using a spring-loaded pin represented in U.S. Pat. No. 4,919,446 which was issued Apr. 24, 1990 to Higgins. This design, however, does not provide an automatic releasing mechanism and does not provide a secondary securing member to restrict movement of the boat's eyehook toward the tow vehicle.

Another earlier design for latching a boat to a trailer was a mechanism using a spring-loaded pin represented in U.S. Pat. No. 3,989,267 which was issued Nov. 2, 1976 to Robinson. This design, however, does not provide an automatic latching or release mechanism, is difficult to attach to a typical modern boat trailer, does not employ a bow guide, does not provide a secondary securing member to restrict movement of the boat's eyehook toward the tow vehicle, and eliminates the potential use of the traditional winch apparatus.

Another such earlier design is represented in U.S. Pat. No. 5,120,079 issued Jun. 9, 1992 to Boggs. The novelty of this design was in the bow guide used to protect the boat and invention. And while a locking pin mechanism was used, no automatic release mechanism was employed and no secondary securing member to restrict movement of the boat's eyehook toward the tow vehicle is described.

Another earlier design which used a spring loaded pin is represented in U.S. Pat. No. 4,114,920 issued Sep. 19, 1978 to Boettcher. While a spring loaded pin assembly was used in combination with a bow guide, neither a release mechanism nor the ability to use the winch and strap apparatus was possible and the trailer mounting design is complicated and adds numerous parts. Also, no secondary securing member to restrict movement of the boat's eyehook toward the tow vehicle is described.

Another earlier design which employs a spring loaded pin and a bow guide is U.S. Pat. No. 5,193,835 issued Mar. 16, 1993 to Sheets. This design, however, does not entail a simple to install, one piece designed apparatus that has an automatic release mechanism accompanying the securing mechanism nor a secondary securing member to restrict movement of the boat's eyehook toward the tow vehicle is described.

A more recent design which does not employ a pin mechanism but does have an automatic release mechanism is U.S. Pat. No. 6,923,138 issued Aug. 2, 2005 to Holbrook. The mechanism utilizes a motor driven rotating head on a shaft that protrudes from the bow of a boat and is captured and released by two steel plates. The mechanism is relatively complicated with numerous moving parts in various conditions. It also requires modification to the standard bow securing eye found on most boats and does not allow for the traditional winch, strap and hook method to be used as a back-up.

Referring to FIG. 1, a side elevational view of a boat 12 loaded on a boat trailer 38 which includes a prior art latching mechanism. The boat 12 may be pulled up onto the boat trailer 38 by a securing eye 16, such as an eyehook, by means of a hook attached to a strap 32 and retrieved by a winch 30. The winch 30 may be powered by hand by means of a winch handle 31 or by electric motor and may be attached to a winch housing 34 by a bolt 40. The centerline of the boat 12 may be guided by a roller 42 that may be mounted by means of a mounting bolt 66 at the end of a first winch arm extension 8a and a second winch arm extension 8b (not pictured) and keeps boat 12's bow centered on the boat trailer 38. The entirety of the prior art latching mechanism may be supported by a first winch pedestal 36a and a second winch pedestal 36b.

SUMMARY OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated herein being contemplated as would normally occur to one skilled in the art to which the invention relates.

An example of embodiments of the present invention includes a body, made of corrosion resistant plastic or other composite, which features a lower mounting bracket that is adaptable to attach to most boat trailers by use of a single bolt, an upper "V" shaped boat bow guide that aligns a boat's bow section with a "V" shaped receiver that aligns the boat's securing eye with a securing member and a securing member release trigger. The body also houses the securing, or locking, or engaging, or closing mechanism and the releasing, or opening, or disengaging, or unlocking mechanism that includes an energy storage device biasing a securing member held in an open or closed condition by an energy storage device loaded trigger. Said trigger may be tripped by contact with a boat's securing eye either as the boat is being loaded onto the trailer or as the boat is being offloaded from the trailer into the water. When tripped, the trigger disengages from the securing member allowing said securing member to slide into either the opened or closed condition. The securing member may be biased by a biasing mechanism, through an energy storage device that can be set to move the securing member to an open condition or move the securing member to a closed condition within a securing member path and perpendicular to the V-shaped receiver. Said energy storage devices, securing members, biasing mechanism, and trigger may be made of corrosion resistant metal or other composite.

What is consistently absent from the prior art is an automatic releasing mechanism accompanying the securing mechanism. An embodiment of the present invention not only solves the problems associated with manually loading a boat onto a trailer using a novel mechanism, it also provides a safe, convenient, simple and reliable means of releasing a boat from a trailer. Embodiments of the present invention may be realized in an automatic boat latching and releasing apparatus. The body and accompanying latching mechanism of the present invention mounts on an appropriately equipped boat trailer and secures or releases the securing eye that may be mounted on the centerline of the lower bow section of most boats.

DETAILED DESCRIPTION OF THE PREFERRED EMBODIMENTS

Figure 1:
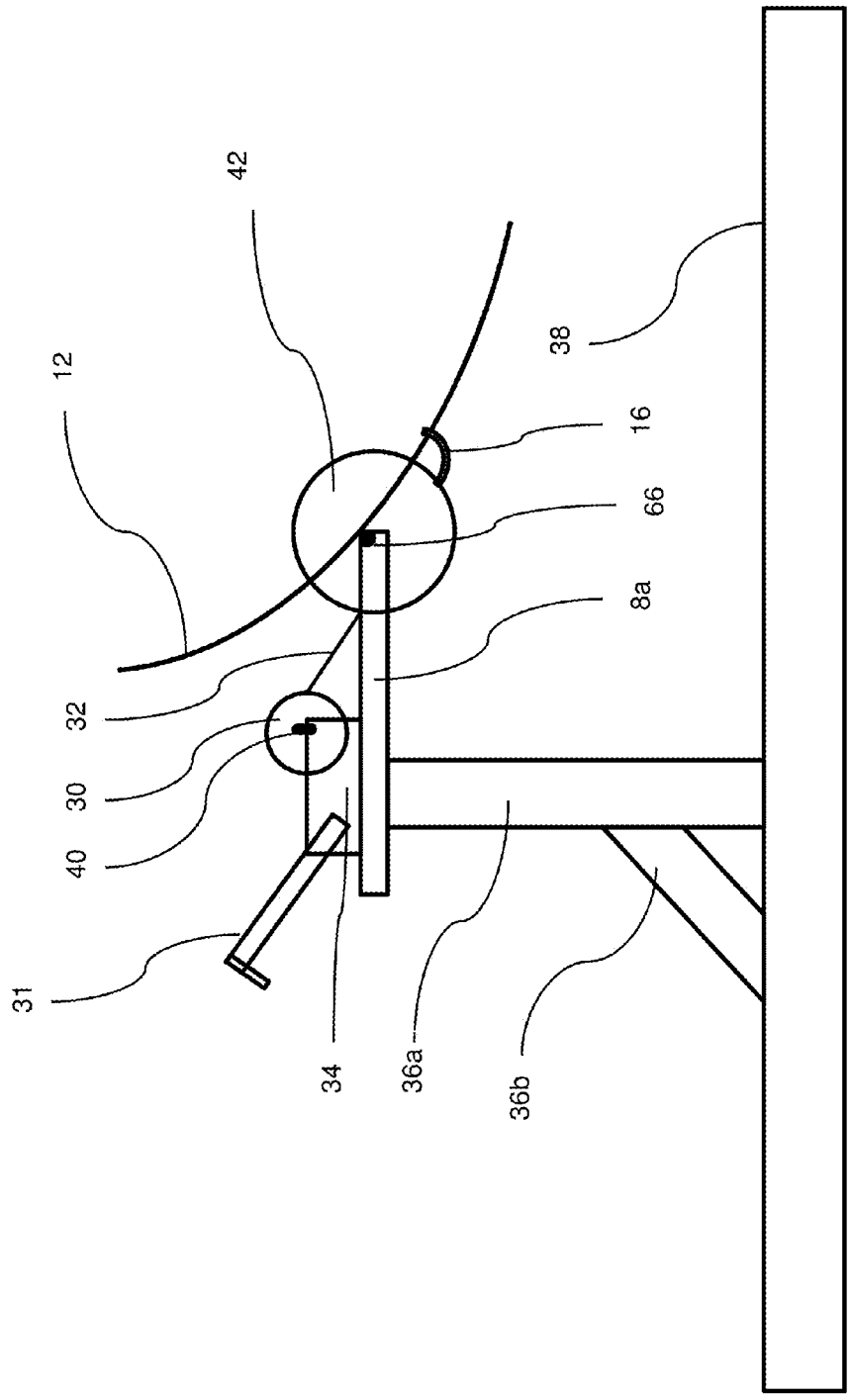
FIG. 1 is a side elevational view of a boat loaded on a boat trailer which includes a prior art latching mechanism.

In reference to FIGS. 2-6, an example of an embodiment of the present invention latching and releasing mechanism is illustrated. A housing 1 that includes a first bow guide 2a and a second bow guide 2b align the boat's centerline with a bow guide centerline 56 and a similarly oriented V-shaped receiver 14. A trigger insert 4c, biased by a secondary energy storage device 26, such as a spring, alternately locks a securing member 52 by means of a first slot 50a and a second slot 50b subsequently restricting movement of securing member 52 unless and until a trigger 4a is forced into a release condition. Said restricted movement of securing member 52 is persistent regardless of bias by a main energy storage device 22, such as a spring, absent appropriate force to release trigger 4a and attached trigger insert 4c. Lateral movement of main energy storage device 22 is restricted by an energy storage device slot 58. Trigger 4a pivots on a pivot point 28 and can be made to release from securing member 52 by means of pressure from an advancing securing eye 16 (pictured in FIGS. 6, 7 and 8) through a securing eye slot 54 or by use a trigger release 4b. Said securing member 52 slides within energy storage device slot 58 and a securing member slot 62 upon the condition that the main energy storage device 22 biases said securing member 52 and the trigger 4a is moved to the release condition. Said main energy storage device 22 pressures securing member 52 to be in a closed or open condition pursuant to pressure from a biasing mechanism 18 which consists of a biasing mechanism securing member 20 which is attached to a biasing mechanism handle 24. Said biasing mechanism handle 24 may be moved to a condition in a first biasing mechanism slot 64a or a second biasing mechanism slot 64b. Movement of biasing mechanism securing member 20 may be guided by a biasing mechanism securing member slot 60.

Figure 2:
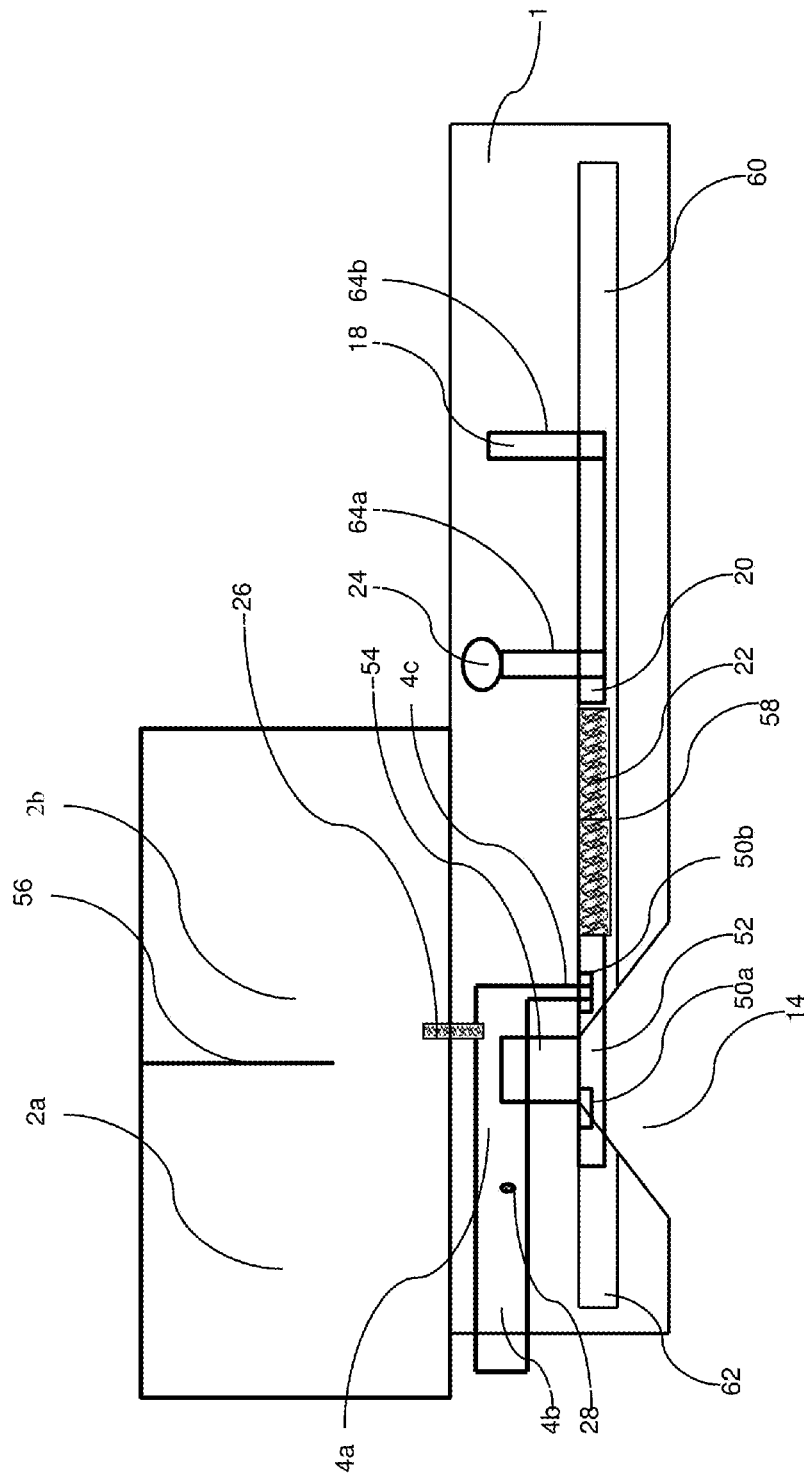
FIG. 2 is a top perspective view is a latching and release mechanism according to one embodiment of the present invention.

FIG. 2 illustrates an example of an embodiment of the present invention in a condition in which securing member 52 is closed and biasing mechanism 18 is in a locked condition, exemplified by biasing mechanism handle 24 being locked in position in first biasing mechanism slot 64a closest to securing eye slot 54 as opposed to biasing mechanism handle 24 being in the open condition in second biasing mechanism slot 64b. By means of securing member 52, securing eye slot 54 is enclosed. Trigger 4a is in a lock condition in second slot 50b restricting securing member 52 in the closed condition and restricting said securing member 52 from sliding to the open condition within energy storage device slot 58 or securing member slot 62. Main energy storage device 22 is slightly compressed by biasing mechanism securing member 20 in the lock condition and securing member 52 in the closed condition. Secondary energy storage device 26 is marginally compressed between housing 1 and trigger 4a pressuring trigger insert 4c to penetrate second slot 50b. Manual trigger release 4b is protruding from housing 1.

Figure 3:
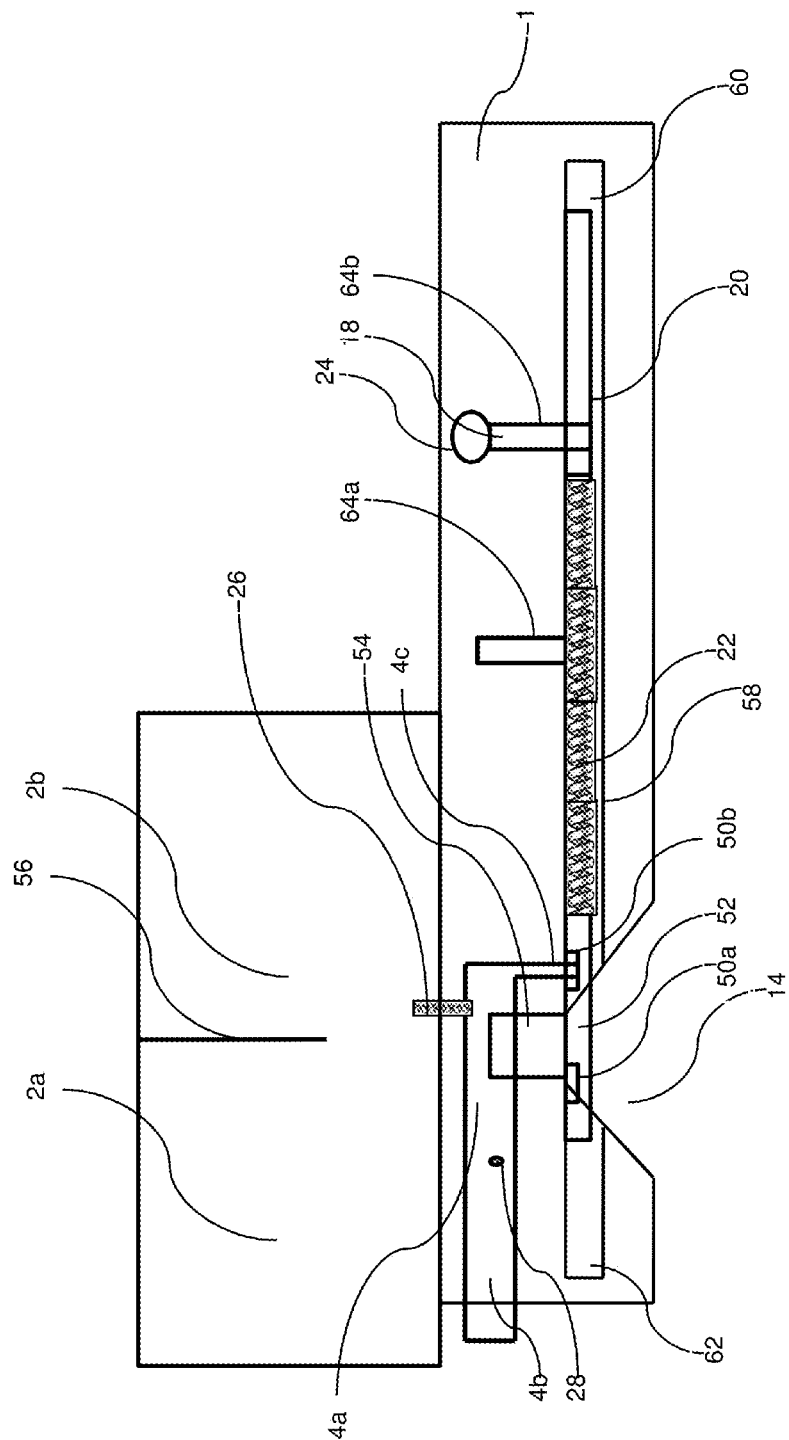
FIG. 3 is a top perspective view of the FIG. 2 latching and releasing mechanism in a secured and ready-to-release condition.

FIG. 3 illustrates an example of an embodiment of the present invention in a condition in which securing member 52 is closed and biasing mechanism 18 is in the release condition, exemplified by biasing mechanism handle 24 being locked in position farthest from securing eye slot 54 in second biasing mechanism slot 64b. By means of securing member 52, securing eye slot 54 is enclosed in spite of contrary pressure from main energy storage device 22. Trigger 4a is in a lock condition in second slot 50b restricting securing member 52 in the closed condition and restricting said securing member 52 from sliding to the open condition further into energy storage device slot 58 and out of securing member slot 62. Main energy storage device 22 is fully stretched by biasing mechanism securing member 20 in the release condition and securing member 52 in the closed condition. Secondary energy storage device 26 is marginally compressed between housing 1 and trigger 4a pressuring trigger insert 4c to penetrate second slot 50b.

Figure 4:
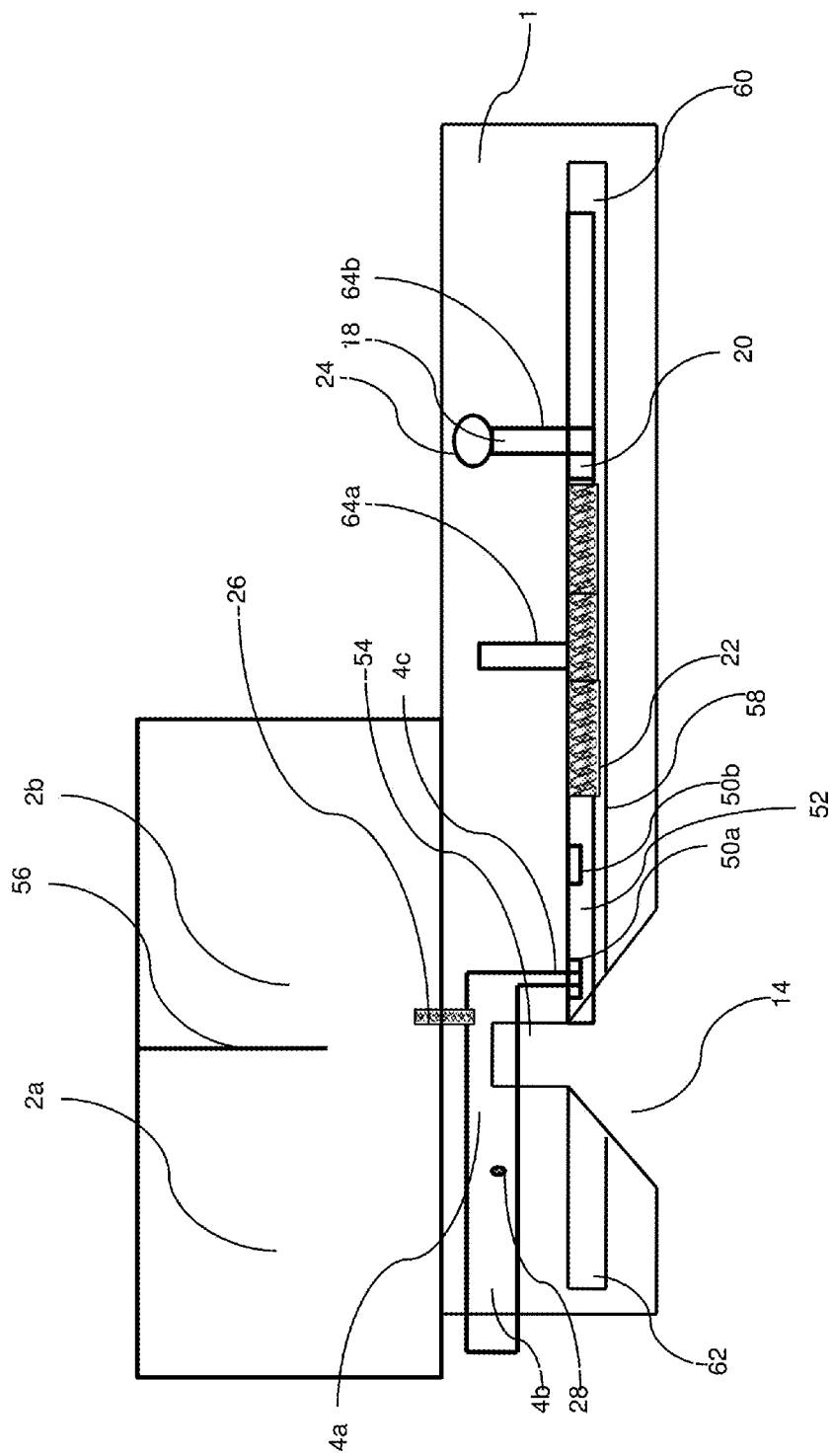
FIG. 4 is a top perspective view of the FIG. 2 latching and releasing mechanism in a released condition.

FIG. 4 illustrates an example of an embodiment of the present invention in a condition in which securing member 52 is open and biasing mechanism 18 is in the release condition, exemplified by biasing mechanism handle 24 being locked in position farthest from securing eye slot 54. Through the V-shaped receiver 14, securing eye slot 54 is receptive to, or has released, securing eye 16. Trigger 4a is in a lock condition in first slot 50a restricting securing member 52 in the open condition and restricting said securing member 52 from sliding to the closed condition within energy storage device slot 58 and into securing member slot 62. Main energy storage device 22 is marginally stretched by biasing mechanism securing member 20 in the release condition and securing member 52 in the open condition. Secondary energy storage device 26 is marginally compressed between housing 1 and trigger 4a pressuring trigger insert 4c to penetrate first slot 50a.

Figure 5:
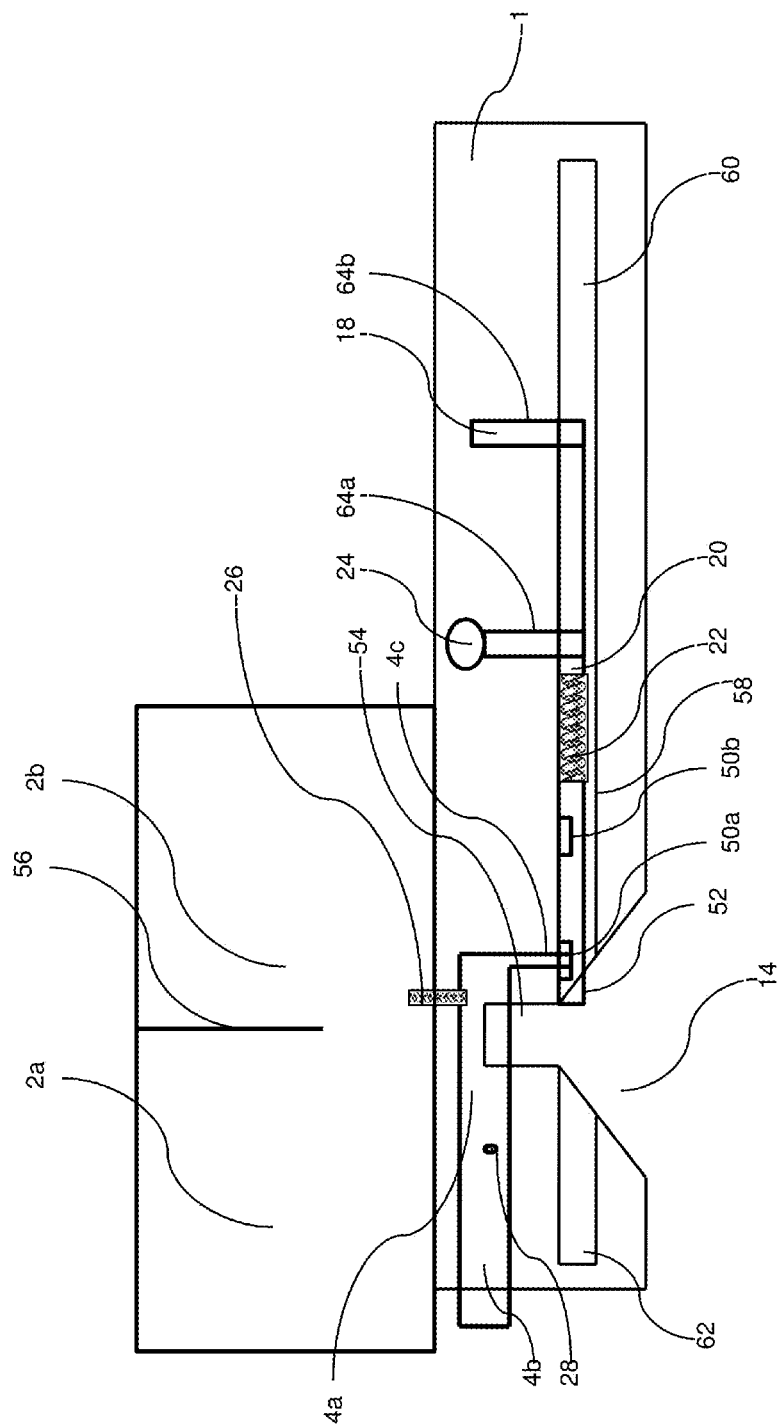
FIG. 5 is a top perspective view of the FIG. 2 latching and releasing mechanism in a secured and ready-to-lock condition.

FIG. 5 illustrates an example of an embodiment of the present invention in a condition in which securing member 52 is open and biasing mechanism 18 is in the lock condition, exemplified by biasing mechanism handle 24 being locked in position closest to securing eye slot 54. Through the V-shaped receiver 14, securing eye slot 54 is receptive to, or has released, securing eye 16. Trigger 4a is in a lock condition in first slot 50a restricting securing member 52 in the open condition and restricting said securing member 52 from sliding to the closed condition within energy storage device slot 58 and into securing member slot 62. Main energy storage device 22 is fully compressed with energy storage device slot 58 by biasing mechanism securing member 20 in the lock condition and securing member 52 in the open condition. Secondary energy storage device 26 is marginally compressed between housing 1 and trigger 4a pressuring trigger insert 4c to penetrate first slot 50a.

Figure 6:
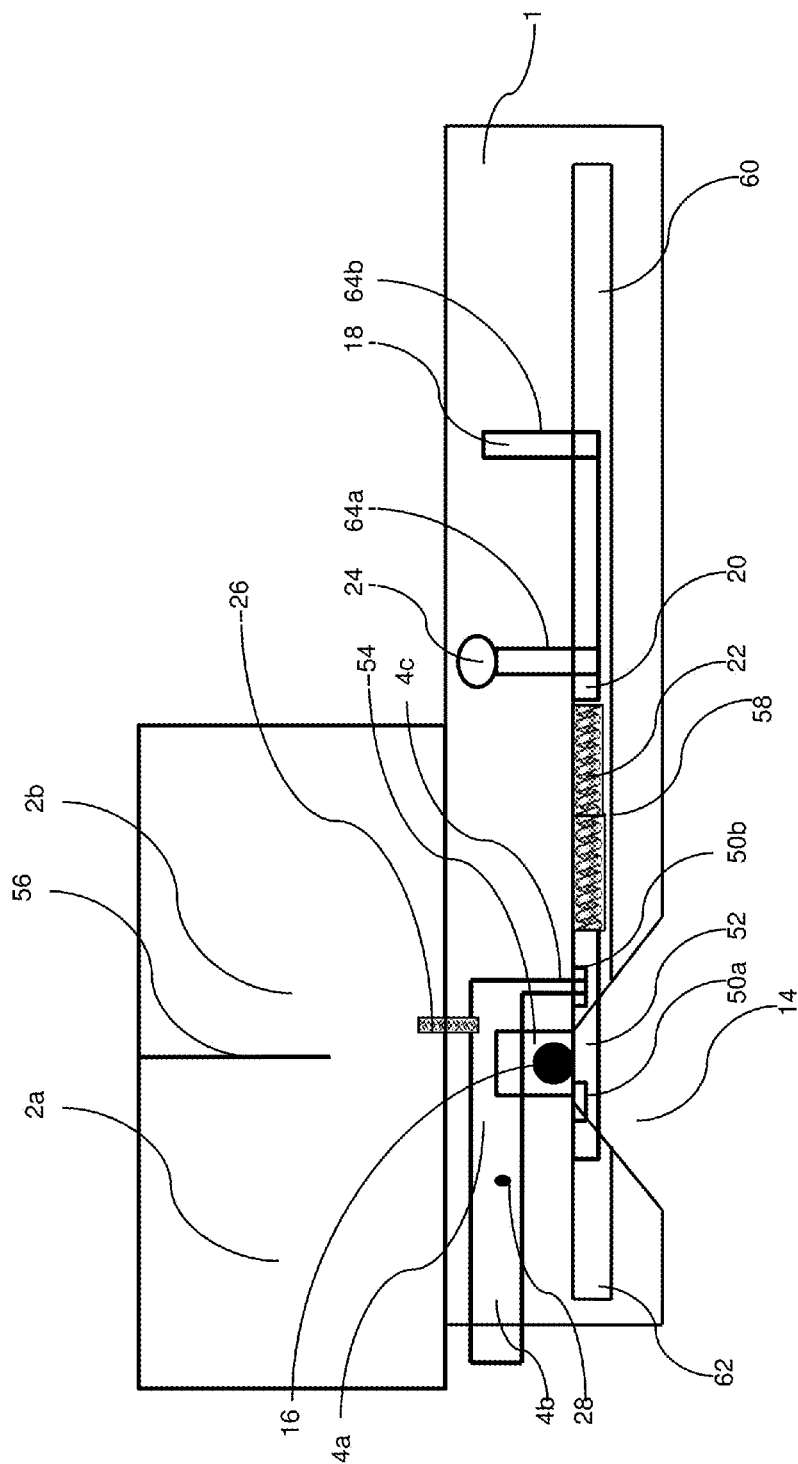
FIG. 6 is a top perspective view of the FIG. 2 latching and releasing mechanism in a secured and locked condition.

FIG. 6 illustrates a mirror image of FIG. 2 in aspects except that securing eye 16 is illustrated in a locked condition restricted by securing member 52 and enclosed within securing eye slot 54.

Figure 7:
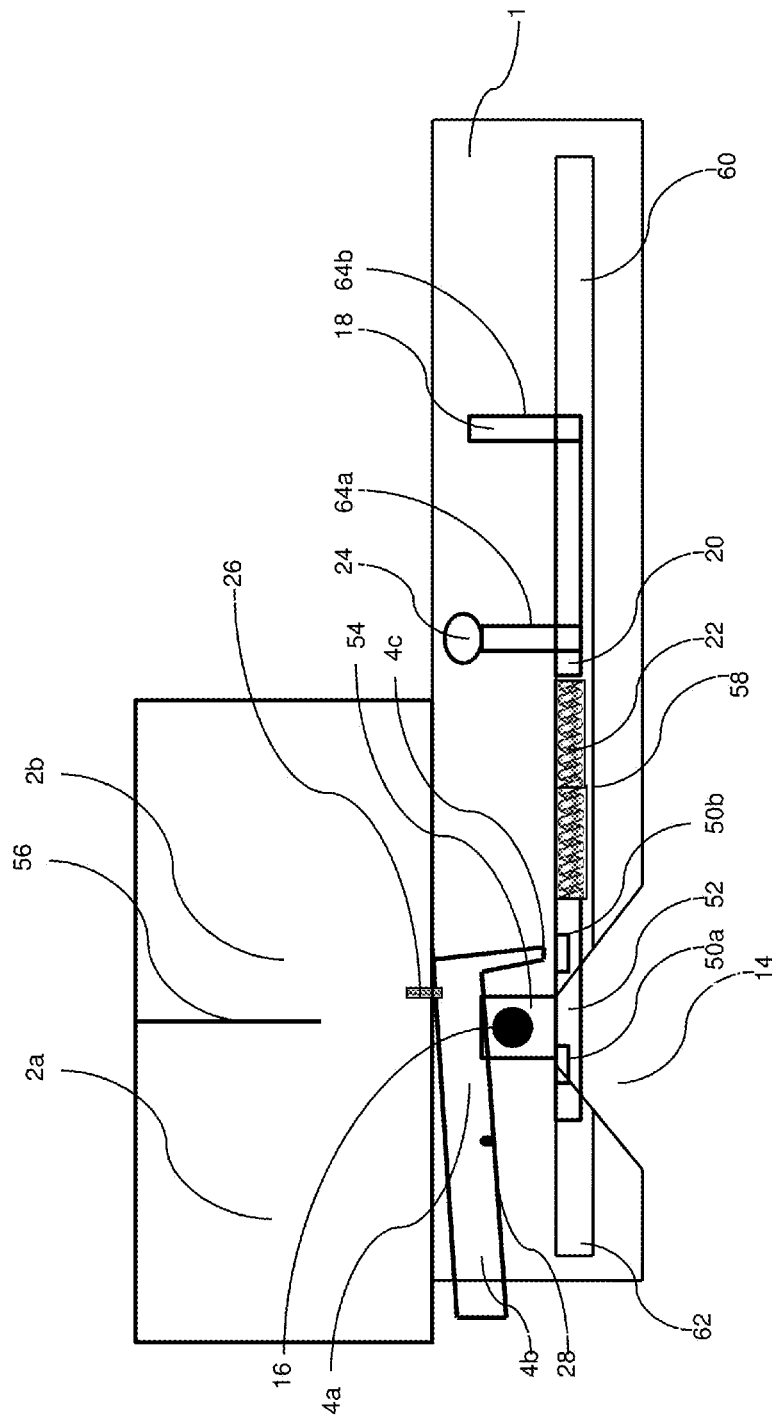
FIG. 7 is a top perspective view of the FIG. 2 latching and releasing mechanism in a loading condition.

FIG. 7 illustrates a mirror image of FIG. 6 in aspects except that the securing eye 16 has applied force through contact to trigger 4a pushing trigger insert 4c to disconnect from second slot 50b. Said disconnect of trigger insert 4c allows securing member 52 to move to the position biased by main energy storage device 22, in this illustration, securing member 52 has remained in the closed condition. Upon release of the force by securing eye 16, trigger insert 4c may reconnect to a position in second slot 50b. Regardless of the position of trigger insert 4c however, pressure from main energy storage device 22, biased by the lock condition of biasing mechanism securing member 20 in this illustration, may force securing member 52 to remain in the closed condition. This aspect of the design of the current invention is intentional and provides a safety measure by maintaining the closed condition of securing member 52 when biasing mechanism securing member 20 is in the lock condition thereby restricting the release of securing eye 16 from securing eye slot 54 regardless of the disposition of trigger insert 4c.

Figure 8:
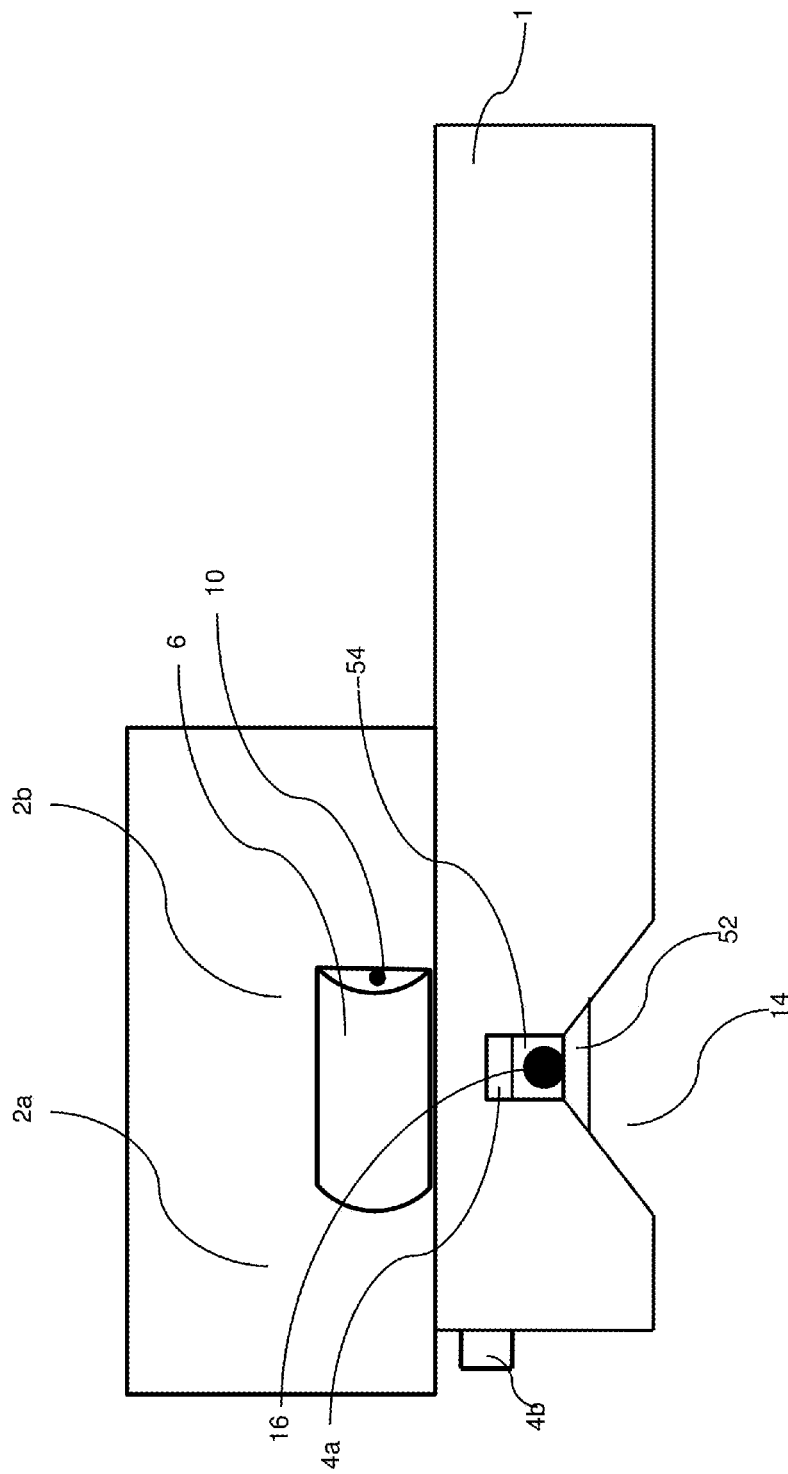
FIG. 8 is a perspective view of the bottom surface of the housing.

FIG. 8 illustrates a perspective view of the bottom surface of housing 1. Illustrated are the lower portion of the first bow guide 2a and second bow guide 2b. A Mounting bracket 6 is penetrated longitudinally by a mounting bolt slot 10. Trigger 4a is in the locked condition and securing member 52 is closed restricting movement from securing eye 16 out of securing eye slot 54 and into V-shaped receiver 14. Manual trigger release 4b is observable.

Figure 9:
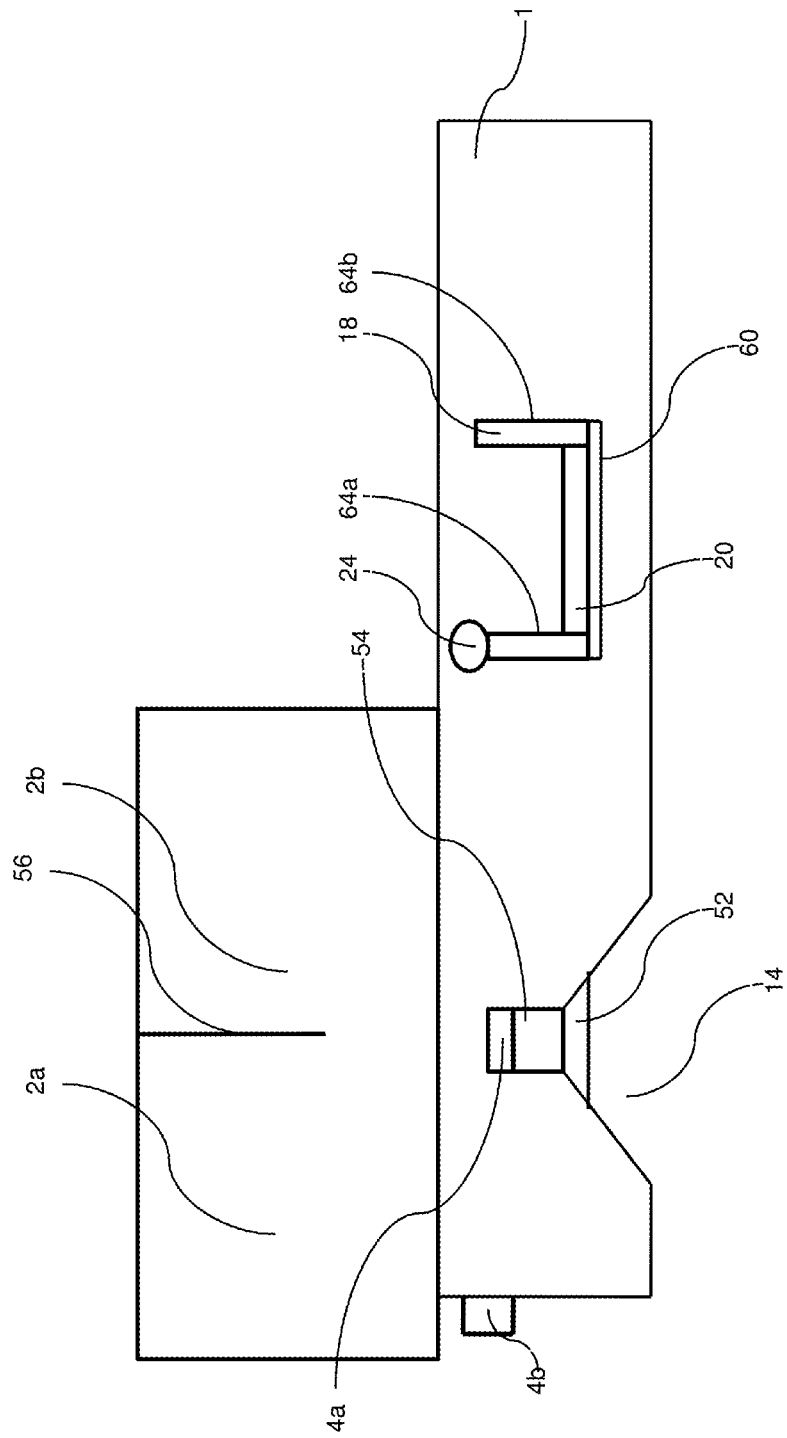
FIG. 9 is a perspective view of the top surface of the housing.

FIG. 9 is a perspective view of the top surface of housing 1. First Bow guide 2a and second bow guide 2b are split perpendicularly by bow guide centerline 56. V-shaped receiver 14 is aligned with bow guide centerline 56. Securing member 52 is in the closed condition and trigger 4a is in the lock condition. Biasing mechanism handle 24 is in the lock condition in first biasing mechanism slot 64a exposing biasing mechanism securing member 20, a portion of biasing mechanism 18. Manual trigger release 4b can be observed protruding from housing 1. Second biasing mechanism slot 64b is also observable.

Figure 10:
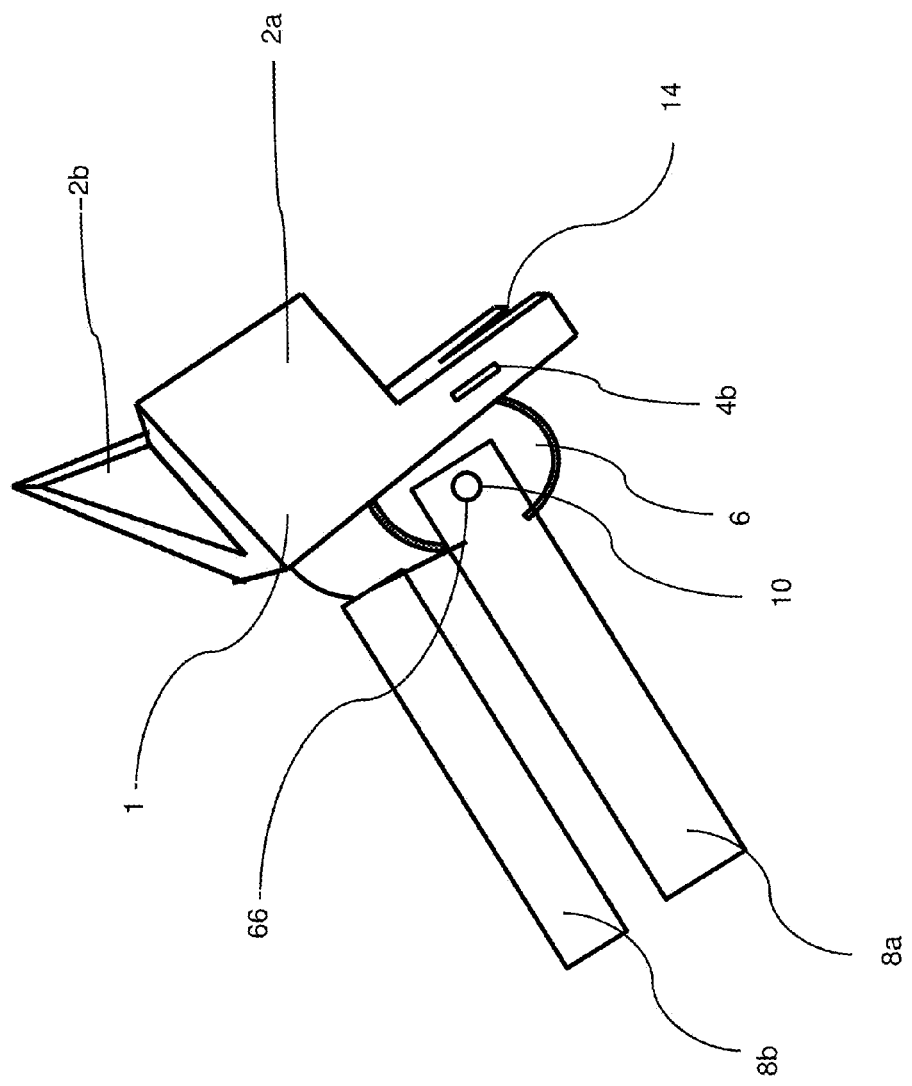
FIG. 10 is a side perspective view with mounting assembly.

FIG. 10 illustrates a side perspective view of the current invention as mounted on a boat trailer (not pictured). Mounting bolt 66 penetrates first winch arm extension 8a and second winch arm extension 8b through mounting bolt slot 10 and mounting bracket 6 securing the surface of the current invention close to parallel to the bow section of the boat (not pictured). First bow guide 2a and second bow guide 2b align the boats bow with V-shaped receiver 14. Manual trigger release 4b can be observed protruding from housing 1.

Figure 11:
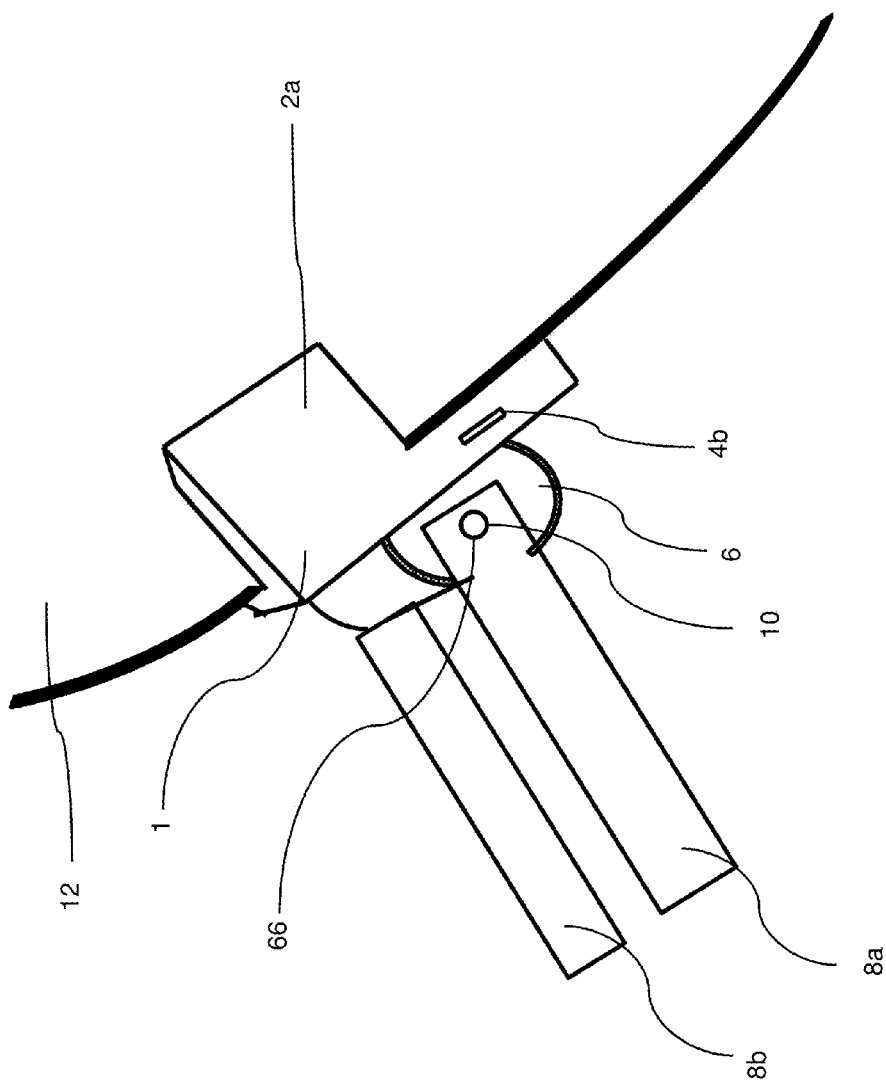
FIG. 11 is a side perspective view with mounting assembly with a boat.

FIG. 11 mirrors FIG. 10 with the exception that boat 12 has been illustrated and second bow guide 2b and V-shaped receiver 14 are no longer visible behind boat 12.

Figure 12:
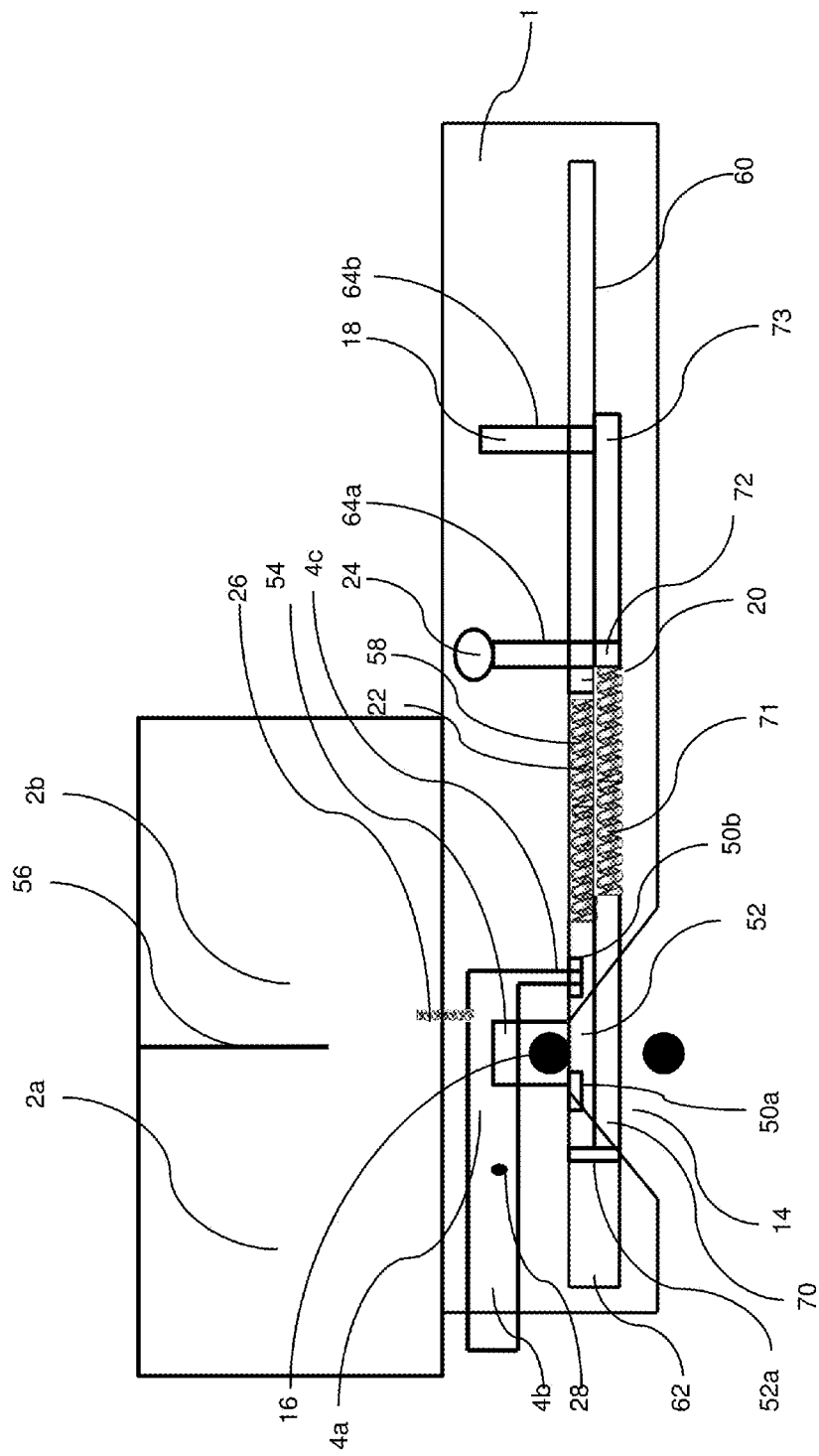
FIG. 12 is a top perspective view with secondary securing member in a locked condition.

FIG. 12 represents a top perspective view of another embodiment of the current invention. A secondary securing member 70 may be employed within housing 1 to restrict movement toward the tow vehicle of securing eye 16 in V-shaped receiver 14 and securing eye slot 54. Secondary securing member 70 may slide within a secondary energy storage device slot 73 and parallel to securing member 52, energy storage device slot 58 and main energy storage device 22 and may be biased by a secondary securing member energy storage device 71 that may be attached to a biasing mechanism extension 72 which may be secured to biasing mechanism 18. Biasing mechanism 18 may bias securing member 20 which may be guided by biasing mechanism securing member slot 60 and may bias secondary securing member 70 with biasing mechanism handle 24 in either first biasing mechanism slot 64a or second biasing mechanism slot 64b. Secondary securing member 70 may be in lock or release condition when securing member 52 is in the locked condition and may only be in the release condition when securing member 52 is in the release condition due to pressure from a securing member tip extension 52a and within securing member slot 62. Secondary securing member 70 may move independent of trigger 4a, trigger manual release 4b, trigger insert 4c and secondary energy storage device 26. In this illustration, secondary securing member 70 is in a locked condition, biasing mechanism 18 is in the lock condition with biasing mechanism handle 24 in first biasing mechanism slot 64a.

Figure 13:
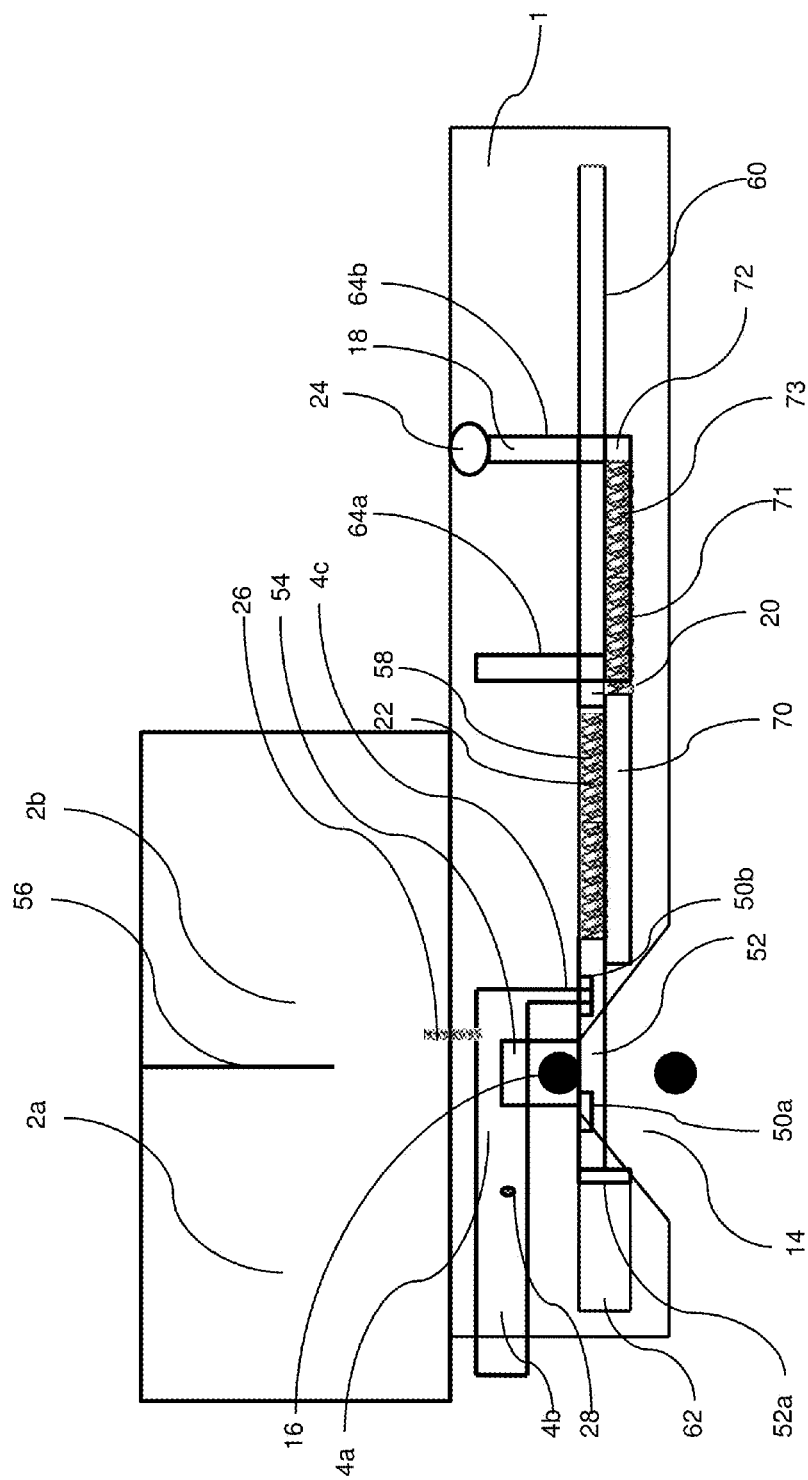
FIG. 13 is a top perspective view with secondary securing member in a released condition.

FIG. 13 mirrors FIG. 12 with the exception that secondary securing member 70 has been biased to move to a release condition within secondary securing member slot 73 through bias by secondary securing member energy storage device 71 which may be biased by the movement of biasing mechanism extension 72 when biasing mechanism handle 24 is moved from first biasing mechanism slot 64a to second biasing mechanism slot 64b.

Figure 14:
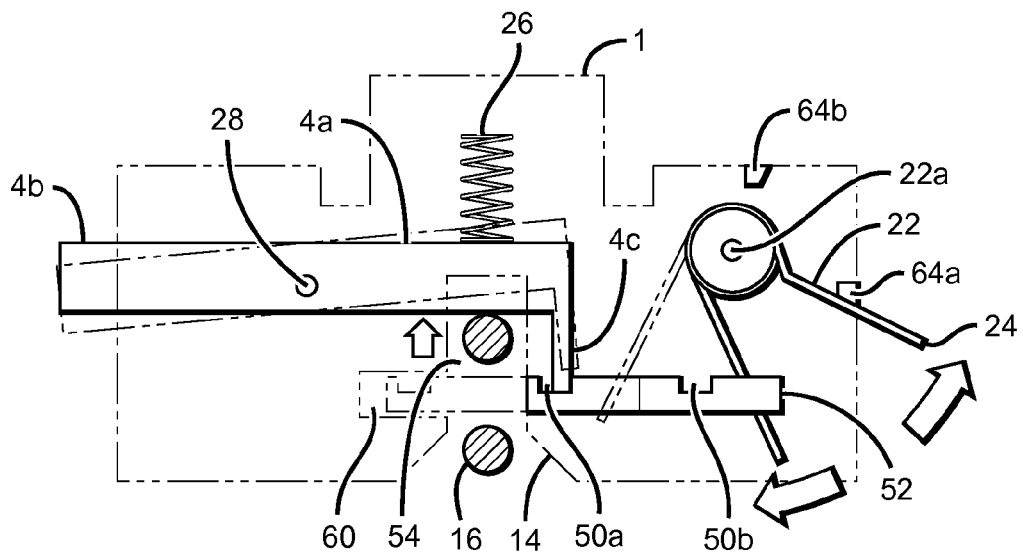
FIG. 14 is a top perspective view of a latching and release mechanism according to one embodiment of the present invention with the securing member in a locked condition.

FIG. 14 illustrates another embodiment of the current invention using an alternate energy storage device. Main energy storage device 22 may rotate around a main energy storage device pivot 22a biasing securing member 52 within biasing mechanism securing member slot 60. Trigger 4a may restrict the movement of securing member 52 dependent upon the position of trigger insert 4c in either first slot 50a or second slot 50b. Trigger 4a may rotate around trigger pivot 28 which may be tripped by the approaching securing eye 16 or manually using trigger manual release 4b.

Figure 15:
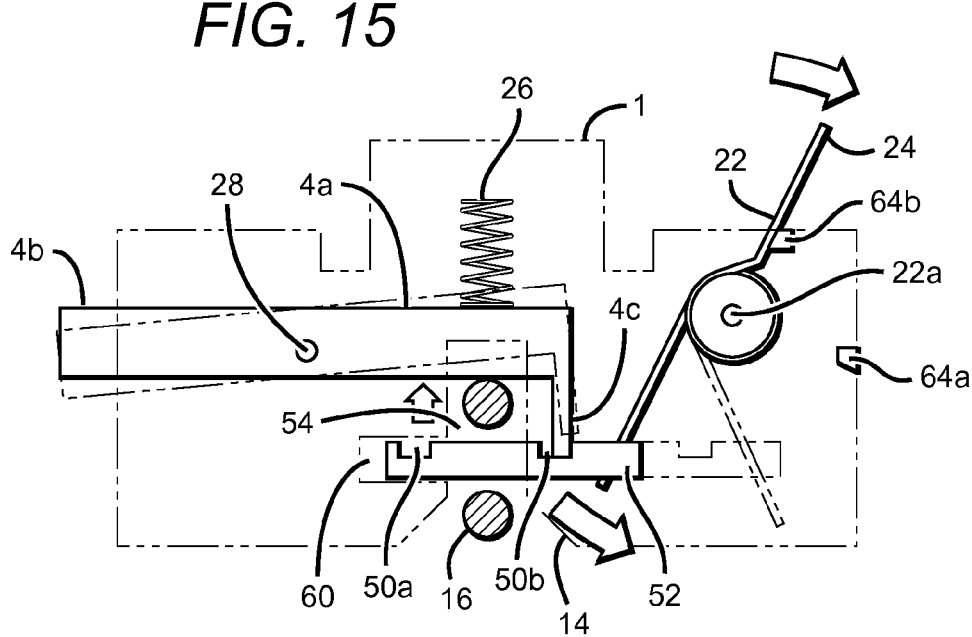
FIG. 15 is a top perspective view of a latching and release mechanism according to one embodiment of the present invention with the securing member in a release condition.

FIG. 15 mirrors FIG. 14 with the exception that main energy storage device 22 has rotated on Main energy storage device pivot 22a biasing securing member 52 to move to a release condition, and trigger insert 4c has moved from second slot 50b to first slot 50a.

While trigger 4a, securing member 52, biasing mechanism 18 and main energy storage device 22 all work together to secure or release a securing eye 16, each works independently as well. A further explanation follows.

Biasing mechanism 18 has two preferred settings and may be set manually. The first setting is achieved when biasing mechanism handle 24 is positioned in the first biasing mechanism slot 64a which is closest to the securing member slot 54. This condition may be employed at all times other than when the boat is being launched and biases main energy storage device 22 to push securing member 52 toward the locked condition in securing member slot 62. Securing member 52 may in fact be locked by trigger insert 4c in an open condition when biasing mechanism 18 is in the locked condition until the trigger 4a is tripped by the boat 12 securing eye 16 or manually by using trigger manual release 4b. Upon the closing of securing member 52 while biasing mechanism 18 is in a locked condition with biasing mechanism handle 24 in first biasing mechanism slot 64a, a small degree of bias from main energy storage device 22 will persist ensuring that securing member 52 remains closed in order to mitigate an unintended release of securing eye 16.

The second preferred setting of the biasing mechanism 18 is achieved by moving biasing mechanism handle 24 away from securing member 52 into second biasing mechanism slot 64b. This condition may be used when launching boat 12 or during maintenance of the invention. In this condition, biasing mechanism 18 biases main energy storage device 22 to retract securing member 52 when the trigger 4a is tripped thereby unrestricting movement of securing eye 16 from securing slot 54 and toward V-shaped receiver 14. Securing member 52 will remain, if initially so, in the closed condition unless and until the trigger 4a is tripped.

A third setting for biasing mechanism 18 may be possible. In the event that biasing mechanism handle 24 is not deployed in one of the preferred settings in first biasing mechanism slot 64a or second biasing mechanism slot 64b, then main energy storage device 22 may convey no bias to securing member 52.

There are two preferred securing member 52 conditions. The closed condition is preferred to be used whenever boat 12 is on the trailer, except during a period of the launching process, and securely attaches the boat 12 securing eye 16 to the boat trailer 38. Said securing member 52 may be closed when trailering boat 12, when backing boat 12 down the launch ramp and when driving boat 12 up the launch ramp after retrieval. The initial securing member 52 condition may be maintained in the closed condition, if so biased by main energy storage device 22, by the trigger insert 4c in first slot 50a until trigger 4a is pressured to pivot on trigger pivot 28 subsequently disengaging trigger insert 4c from first slot 50a thereby allowing securing member 52 to slide to the open condition. The closed condition of securing member 52 may also be achieved from an open condition, if so biased by main energy storage device 22, through pressure on trigger 4a, the subsequent pivot of trigger 4a on trigger pivot 28 and the disengagement of trigger insert 4c from second slot 50b.

The other securing member 52 condition is the open condition and may be used as boat 12 is being released from boat trailer 38 and before being retrieved again. The open securing member 52 condition may be the result of both biasing mechanism handle 24 being in second biasing mechanism slot 64b biasing main energy storage device 22 to pressure securing member 52 toward the open condition and securing eye 16 contacting trigger 4a thereby moving trigger insert 4c to be disengaged from second slot 52 in securing member 52. Said securing member 52 will remain in the open condition even if biasing mechanism securing member 20 pressures securing member 52 toward the closed condition by means of main energy storage device 22 unless and until the trigger 4a is tripped with sufficient force. Said securing member 52 may move to the closed condition only after each of the following is accomplished: biasing mechanism handle 24 is within first biasing mechanism slot 64a biasing mechanism securing member 20 to pressure main energy storage device 22 subsequently pressuring securing member 52 toward the closed condition and trigger 4a is tripped disengaging trigger insert 4c from second slot 50b.

There are two preferred release trigger 4a conditions. The release trigger 4a may be in the engaged condition due to force from secondary energy storage device 26 unless sufficient force is applied, which may be by securing eye 16 or manually, to compress secondary energy storage device 26 thereby disengaging trigger insert 4c from first slot 50a or second slot 50b. When trigger 4a is engaged, securing member 52 may be prevented from moving regardless of the condition of the biasing mechanism handle 24 or said securing member 52. Upon the tripping of trigger 4a, securing member 52 may achieve the condition for which it is currently biased, from either open to closed or vice versa, in relation to the disposition of the biasing mechanism handle 24 and biasing mechanism securing member 20. For example, if biasing mechanism handle 24 is in second biasing mechanism slot 64b and securing member 52 is in the closed condition, upon the tripping of the release trigger 4a, securing member 52 may retract to the release condition. This may allow the release of securing eye 16. In another example, if biasing mechanism handle 24 is in first biasing mechanism slot 64a and securing member 52 is in the open condition, upon the tripping of trigger 4a, securing member 52 may move into the closed condition. This may secure securing eye 16 in a secured condition in securing slot 54. In other examples, should securing member 52 be in the closed condition and the biasing mechanism handle 24 be in the lock condition in first biasing mechanism slot 64a, or securing member 52 be in the open condition and biasing mechanism handle 24 be in the release condition in second biasing mechanism slot 64b, then no movement of securing member 52 may result should trigger 4a be tripped. This allows the boat 12 to be trailered without the concern that securing member 52 will retract inadvertently, or conversely, allows securing member 52 to remain in the release condition if desired.

There are four preferred main energy storage device 22 conditions. The first is a fully compressed condition and may be the result of said main energy storage device 22 being compressed between securing member 52 in the release condition and biasing mechanism securing member 20 in the lock condition.

The second main energy storage device 22 condition is a slightly compressed condition and may be the result of securing member 52 being in the lock condition in securing member slot 62 and biasing mechanism securing member 20 being in the lock condition. This may be the most common condition of biasing mechanism 18 and securing member 52 and may be used whenever the boat 12 is loaded on the boat trailer 38 other than during periods of the launch or retrieval process of boat 12.

The third main energy storage device 22 condition is fully stretched and may be achieved by securing member 52 being in the lock condition in securing member slot 62 and the biasing mechanism securing member 20 being is in the release condition exemplified by biasing mechanism handle 24 being in second biasing mechanism slot 64b. This configuration may be used during periods of the boat 12 launching process from the boat trailer 38. In said condition, the main energy storage device 22 may be fully stretched until force is applied to the trigger 4a thereby retracting trigger insert 4c away from first slot 50a allowing securing member 52 to move to the release condition.

The fourth main energy storage device 22 condition is slightly stretched and may be achieved when securing member 52 is in the release condition and the biasing mechanism handle 24 is in the release condition in second biasing mechanism slot 64b. This configuration may be evident immediately after the boat has been launched and while boat 12 is not present on trailer 38.

The present invention in its entirety does not preclude the boater from using the traditional winch 30, strap 32 and hook assembly in the event that the boat 12 is inoperable and must be winched into place on the trailer 38; in which case the automatic securing mechanism can still be used advantageously to simplify the winching process. Furthermore, it is recommended that the winch 30, strap 32 and hook assembly be used in conjunction with this automatic securing and release system as a secondary safety measure.

An example of an embodiment of the present invention incorporates a V-shaped bow guide that may be built into the housing 1. Said bow guide is designed to receive the bow of boat 12 and align the boat 12 centerline and securing eye 16 with V-shaped receiver 14 and securing eye slot 54. In so doing, trigger 4a may be accessible to contact with securing eye 16.

Another example of an embodiment of the present invention is a simple but effective attachment feature that may allow for easy installation on a modern boat trailer 38. A mounting bracket 6 is molded into the lower portion of housing 1 that is designed to be secured to first winch arm extension 8a and second winch arm extension 8b which may previously secure a roller apparatus found a modern boat trailer 38. Installation of the present invention on said trailer may be accomplished using a single bolt (mounting bolt 66). The earlier referenced one piece construction of the invention and the accompanying mounting bracket 6 may ensure that the invention in its entirety will remain in the optimal position to receive the boat 12 bow section and align said boat's securing eye 16 with the invention's V-shaped receiver 14. Said optimal position may initially, absent contact from the boat, be slightly downward relative to the angle of the boat's centerline vertical angle. However, upon and after contact of the boat 12, first bow guide 2a and second bow guide 2b, the bow guide centerline 56 may remain vertically and horizontally flush against the boat 12 centerline by pivoting longitudinally on the mounting bolt 66 as said boat 12 advances on boat trailer 38. Said pivoting allows the invention to adapt to the various vertical steepnesses of modern boats as well as facilitating proper alignment, both vertically and horizontally, of the invention against the varying vertical steepness of a numerous boats as well as a particular boat 12 during the loading and unloading process. Said positioning also facilitates the alignment of boat 12 on the boat trailer 38, aligns the boat 12 securing eye 16 with the V-shaped receiver 14 as well as ensuring that the trigger 4a mechanism will not be tripped on the boat 12 bow rather than on securing eye 16.

Critical elements make the present invention novel. The specific mechanism employed is unique. The use of a biasing mechanism that facilitates both securing and releasing the boat 12 securing eye 16 is unique. The one piece design that incorporates the securing and releasing mechanism, a novel bow guide design which properly aligns securing eye 16 with the securing and releasing mechanism, a simple mechanism for attaching the invention to boat trailer 38 and the ability to continue to use the traditional winch 30, strap 32 and hook apparatus as a secondary safety measure each make the invention novel.

Now although the systems described have been discussed in relation to a boat, those systems may be adapted to other watercraft types with minor modification, for example personal watercraft such as jet skis. Described systems might also be adapted for use with land vehicles, for example all terrain vehicles that may be trailered. The scope of the above described systems should therefore be interpreted broadly rather than restrictively.

While various systems incorporating a trailer mountable receiver and release mechanism have been described and illustrated in conjunction with a number of specific settings, a professional will appreciate that variations and modifications may be made without departing from the principles herein described, illustrated and claimed. The present invention, as defined by the appended claims, may be embodied in other specific forms without departing from its spirit or essential characteristics. The configurations described herein are to be considered in all respects to be illustrative, and not restrictive. All changes which come within the meaning and range of equivalency of the claims are to be embraced within their scope.

I claim:

1. A latching mechanism comprising;
    a housing having a recess for receiving a securing eye of the boat;
    a securing member movably disposed along a path within said housing and perpendicular to said recess and having a first end, a second end, a first slot proximate said first end and a second slot proximate said second end;
    a trigger having a mid portion defining a boundary of the recess and having a distal insert for selectively engaging said first slot defining an open condition or said second slot defining a closed condition;
    an energy storage device operatively attached to the securing member to selectively bias the securing member to either: a) said open condition where a portion of the securing member is within said recess while said trigger is engaged with said second slot; or, b) said closed condition where no portion of the securing member extends across said recess while said trigger is engaged with said first slot; and, a secondary energy storage device disposed between the housing and mid portion of said trigger to bias the distal insert of said trigger into contact with said first slot or said second slot and where the bias of said second energy storage device can be overcome to disengage the distal insert of said trigger from either said first slot or said second slot.

2. The latching mechanism of claim 1, further configured so that the securing member is selectively biasable in a first direction and said trigger is selectively engagable in at least one of said first slot and said second slot to substantially prevent movement of the securing member.

3. The latching mechanism of claim 2, further configured so that said trigger is selectively disengagable from at least one of said first slot and said second slot to allow the securing member to move in said first direction.

4. The latching mechanism of claim 3, further configured so that the securing member is configured to engage a securing eye of a boat.

5. The latching mechanism of claim 4, wherein said trigger is configured to selectively receive pressure from the securing eye to selectively disengage said trigger from at least one of the said first slot and said second slot whereupon the securing member moves in said first direction from said open condition to said closed condition.

6. The latching mechanism of claim 5, wherein said first direction is such that the securing member engages the securing eye of a boat.

7. The latching mechanism of claim 1, wherein said energy storage device comprises at least one of a spring, an elastomeric member, gas pressure, liquid pressure, a permanent magnet, an electromagnet, a solenoid, and gravity.

8. The latching mechanism of claim 1, wherein either a compression or tension biasing force is applied to said energy storage device by a biasing mechanism moveably disposed on the housing.

9. The latch mechanism of claim 1 where said recess is a V-shape.

10. A latching mechanism to secure an object in which the object has a securing ring that is appropriately sized to be secured by the latching mechanism, the mechanism comprising:

a housing having a recess appropriately sized for slidably receiving the securing ring of an object;

a slidable securing member at least partially disposed within said housing and having a first end, a second end, a first slot proximate the first end and a second slot proximate the second end;

a trigger having a mid portion that defines a boundary of the recess and having a distal insert for selectively engaging: a) the first slot thereby defining an open condition in which the slidable securing member extends across the recess; or, b) the second slot thereby defining a closed condition in which the slidable securing member is perpendicular to the recess and disposed completely within said housing;

an energy storage device operatively attached to the slidable securing member to selectively bias the slidable securing member to either: a) said open condition while said trigger is engaged with the second slot; or, b) said closed condition while said trigger is engaged with the first slot; and, a secondary energy storage device disposed between the housing and mid portion of said trigger to bias the distal insert of said trigger into contact with the first slot or the second slot and where the bias of said second energy storage device can be overcome to disengage the distal insert of said trigger from either the first slot or the second slot.

* * * * *